(No Model.)
A. H. PARKER.
SUSPENSORY.
No. 521,176. Patented June 12, 1894.
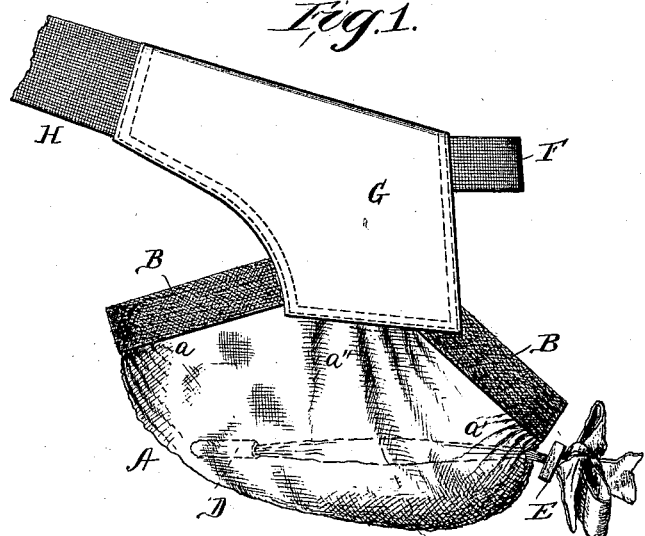
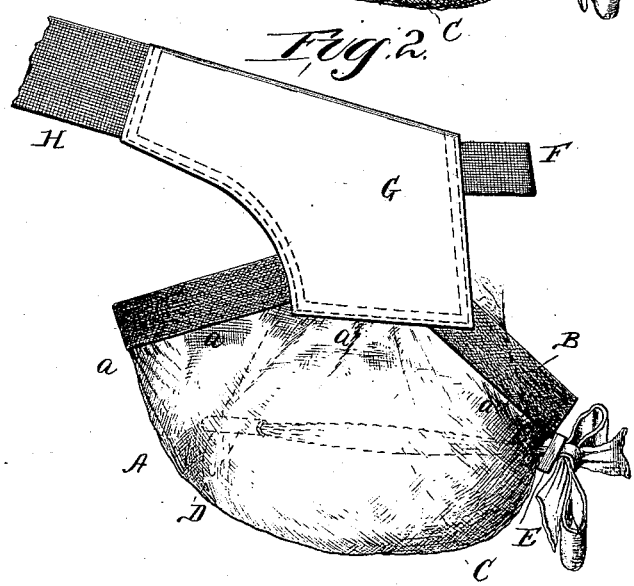
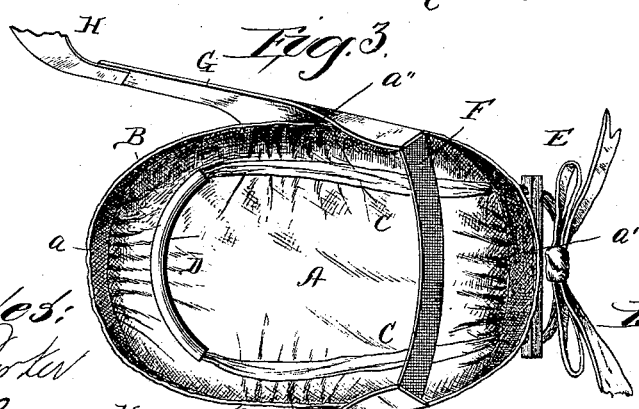

UNITED STATES PATENT OFFICE.

ANDREW H. PARKER, OF EVANSTON, ILLINOIS.

SUSPENSORY.

SPECIFICATION forming part of Letters Patent No. 521,176, dated June 12, 1894.

Application filed January 10, 1893. Serial No. 457,966. (No model.)

*To all whom it may concern:*

Be it known that I, ANDREW H. PARKER, a citizen of the United States, residing at Evanston, in the county of Cook and State of Illinois, have invented certain new and useful Improvements in Suspensories; and I do hereby declare that the following is a full, clear, and exact description of the invention, which will enable others skilled in the art to which it pertains to make and use the same, reference being had to the accompanying drawings, forming a part hereof, in which—

Figure 1 is a side elevation showing the suspensory out of use. Fig. 2 is a side elevation showing the suspensory in use. Fig. 3 is a top or plan view.

The treatment of certain diseases requires the use of what is known or termed a "suspensory" or suspending bandage, to receive and suspend the afflicted parts, and such bandages have heretofore been made of silk or other soft material, usually in the form of a woven fabric, and while they perform the functions required of them, their construction heretofore has been such as not to give a close support, as in use, owing to the nature of the material of which they are usually made, the tendency is for a down-drop or hang, instead of a close support, and, furthermore, in the construction of such suspensories, no means have been applied thereto by which the filling of the vein is prevented, and such prevention is in many cases a necessity.

The object of the present invention is to overcome the objections found in the suspensories now in use, and have such suspensory act to retain the parts naturally and without irritation and injury to the veins and spermatic cord, and to enable a compress to be used with the suspensory, without any change in the action of the suspensory itself, and by which the blood and other fluids will be held against admission to the afflicted parts, and without injury to such parts by the use of the suspensory; and its nature consists in providing a suspensory formed of a woven fabric puckered around the neck, so as to allow of a free expansion to receive the afflicted parts, without any material change in the depth of the suspensory; in providing a compression band having a loop portion located within the suspensory, and lying free and loose therein, and in the several parts and combinations of parts hereinafter described and pointed out in the claims as new.

In the drawings, A represents the net or bag of the suspensory constituting the receiving and supporting portion thereof, which net or bag can be made of silk or other soft material in the form of a woven fabric, and so formed in weaving by dropping stitches on opposite sides as to form, when the fabric is drawn into shape, puckers $a$ at the rear, puckers $a'$ at the front, and puckers $a''$ on each side, opposite one another, which puckers, by reason of the dropping of the stitches, or in otherwise forming the net or bag, stand so as to draw toward the center longitudinal line, and a center cross line, by which, with the opening out of the net or bag, such opening spreads the net or bag fore and aft and sidewise, like the drawing out of a fan, without materially increasing the depth, the increase being only sufficient to give a support to the inserted parts without drawing tight thereon.

B is a binding band, secured around the mouth or neck of the net or bag A, and attached by sewing or otherwise, and holding the puckers $a$, $a'$, $a''$, in place, so as to give the required expansion without too much down drop or hang for the net or bag.

C is a compression band, formed of a piece of ribbon or other suitable soft material, the ends of which, in the arrangement shown, are passed through the net work of the net or bag A, so as to lie outside thereof, where they can be readily tied, while the loop formed by the band lies free and loose within the receiving and supporting portion of the suspensory, as shown in the drawings.

D is a cushion formed of a piece of soft rubber or other suitable material that can be attached to the loop portion of the compression band C, and as shown, this cushion is in the form of a piece of rubber tubing slipped onto the compression band, but can be of any other material having the property of bending to bear on the parts when inserted in the suspensory without any irritation or injurious effects.

E is a retaining or holding strip, which may likewise be a piece of rubber or other soft material having openings through which the ends of the compression band can be passed, and have the retaining strip lie outside of the receiving and supporting portion of the suspensory.

F is a cross band located above the net or bag A.

G are side pieces for the attachment of the cross band F, and to which the net or bag A is attached on each side, by sewing or otherwise.

H are the straps for attaching the suspensory to the body of the user, each strap being sewed or otherwise secured at its inner end to a side piece G.

The receiving and supporting portion is formed by knitting or weaving the fabric, dropping the stitches, as required, for the amount of pucker desired, or in any other suitable manner to produce when the net or bag A is formed into shape, a receiver, having the puckers $a, a', a''$, around the mouth or neck, and the band B is then sewed or otherwise secured to the mouth or neck of the net or bag A, forming the suspensory in the shape shown in Fig. 1, with puckerings at the front, rear and sides thereof; the compression band C, if used in and by itself, which can be the case, has its ends slipped through the net of the receiving and supporting portion of the suspensory, and if used with the cushion D, such cushion is slipped upon or affixed to the compression band, and the compression band then dropped into the receiving and supporting portion and its ends passed through the netting, and if the compression band is used without a retainer E, which can be done, the ends of the band are simply long enough so as to be tied in a bow or other knot which can be readily tied and untied, and if the retainer E is used, such retainer is slipped onto the ends of the compression band outside of the net or bag A; the side pieces G with the cross band F are sewed or otherwise attached to the band B on each side of the net or bag A, and the straps H are sewed or otherwise attached to the side pieces G, completing the suspensory ready for use.

In use, the suspensory is applied and worn as is usual with the application and wearing of suspensories, and when the afflicted parts are in the net or bag A, the expansion of such net or bag is fore and aft and sidewise, with but little dropping, as shown by the drawings, Figs. 1 and 2, Fig. 1 showing the condition of the suspensory when not in use, and Fig. 2 its condition in use, and where the functions of a suspensory alone are to be performed, without any compressing effect for the veins, the compression band C, with the parts thereto attached, is omitted, but where a compression of the veins is required to prevent the influx of blood, the compression band C, either with or without the cushion D and the retainer E, is used, and for the best results a compression band with a cushion D is used, as such cushion enables a tighter compression to be had without any draw on the parts, as might be the case if the band alone was employed.

The action of the suspensory is one giving and allowing a free expansion without any material down-hang or drop, and supporting the afflicted parts in the most natural position, and without any injurious effects from hanging down, and at the same time the support of the parts is one which gives no irritation and will produce no injurious effects, and by using the compression band C to prevent the influx of blood, the danger attending a surgical operation, for the cure of varicocele, which has heretofore been the practice, is avoided, and the result of keeping the blood out of the veins is had without any danger.

What I claim as new, and desire to secure by Letters Patent, is—

1. The combination, in a suspensory, of a receiving and supporting portion, and a compression band having its loop lying free and loose within the receiving and supporting portion, substantially as and for the purposes specified.

2. The combination, in a suspensory, of a receiving and supporting portion, a compression band having the ends passing through, and its loop lying free and loose within the receiving and supporting portion, a cushion on the loop of the band, and a retainer on the ends of the band, substantially as and for the purposes specified.

ANDREW H. PARKER.

Witnesses:
O. W. BOND,
CHAS. W. PARKER.